United States Patent
Wald et al.

(10) Patent No.: US 9,679,367 B1
(45) Date of Patent: Jun. 13, 2017

(54) HUD SYSTEM AND METHOD WITH DYNAMIC LIGHT EXCLUSION

(71) Applicants: Daniel S. Wald, Portland, OR (US); Brandon E. Wilson, Portland, OR (US); Eric P. Stratton, Portland, OR (US); Conor D. Kelly, Hood River, OR (US)

(72) Inventors: Daniel S. Wald, Portland, OR (US); Brandon E. Wilson, Portland, OR (US); Eric P. Stratton, Portland, OR (US); Conor D. Kelly, Hood River, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 114 days.

(21) Appl. No.: 14/260,943

(22) Filed: Apr. 24, 2014

(51) Int. Cl.
*G06T 5/00* (2006.01)
*G06T 5/20* (2006.01)
*G02B 27/01* (2006.01)
*B60K 35/00* (2006.01)

(52) U.S. Cl.
CPC .............. *G06T 5/008* (2013.01); *B60K 35/00* (2013.01); *G02B 27/01* (2013.01); *G06T 5/20* (2013.01)

(58) Field of Classification Search
None
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |

(Continued)

FOREIGN PATENT DOCUMENTS

| | | |
|---|---|---|
| CN | 101881936 A | 11/2010 |
| DE | 1020060 03 785 | 7/2007 |

(Continued)

OTHER PUBLICATIONS

Final Office Action on U.S. Appl. No. 13/250,940 Dated Oct. 17, 2014, 15 pages.

(Continued)

*Primary Examiner* — Mark Zimmerman
*Assistant Examiner* — Yu-Jang Tswei
(74) *Attorney, Agent, or Firm* — Donna P. Suchy; Daniel M. Barbieri

(57) ABSTRACT

A system and method can mitigate or prevent contrast ratio issues due to bright light (e.g., light saturation) in a head up display (HUD). The head up display can include a waveguide combiner (or non-waveguide combiner) and a mitigator disposed to prevent or reduce bright light from being provided through the combiner. The bright light can be direct lunar light, direct solar light, or solar/lunar reflections. The mitigator dynamically selects and reduces bright background light which results in an increase of contrast ratio.

20 Claims, 3 Drawing Sheets

(56) References Cited

U.S. PATENT DOCUMENTS

| | | |
|---|---|---|
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A * | 11/1998 | Barnes .......................... 351/49 |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,757,105 B2 | 6/2004 | Niv et al. |

(56) References Cited

U.S. PATENT DOCUMENTS

| | | |
|---|---|---|
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B2 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |

(56) References Cited

U.S. PATENT DOCUMENTS

| | | |
|---|---|---|
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,913,324 B2 | 12/2014 | Schrader |
| 8,938,141 B2 | 1/2015 | Magnusson |
| 2002/0012064 A1 | 1/2002 | Yamaguchi |
| 2002/0021461 A1 | 2/2002 | Ono et al. |
| 2002/0131175 A1 | 9/2002 | Yagi et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |

(56) References Cited

U.S. PATENT DOCUMENTS

| | | |
|---|---|---|
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0310356 A1* | 12/2011 | Vallius ............................ 353/31 |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1* | 9/2012 | Lacoste et al. ............... 348/148 |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0093893 A1* | 4/2013 | Schofield .......... G06K 9/00818 348/148 |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |
| 2015/0289762 A1 | 10/2015 | Popovich et al. |

FOREIGN PATENT DOCUMENTS

| | | | |
|---|---|---|---|
| EP | 2 110 701 | 10/2009 | |
| EP | 2 225 592 | 9/2010 | |
| EP | 2 381 290 | 10/2011 | |
| EP | 2 733 517 | 5/2014 | |
| FR | 2677463 | 12/1992 | |
| GB | 2 115 178 A | 9/1983 | |
| JP | EP0822441 A2 * | 4/1998 | ........... G02F 1/1335 |
| JP | 2004-157245 | 6/2004 | |
| WO | WO-99/52002 | 10/1999 | |
| WO | WO-03/081320 A1 | 10/2003 | |
| WO | WO-2006/002870 | 1/2006 | |
| WO | WO-2007/130130 A2 | 11/2007 | |
| WO | WO-2007/130130 A3 | 11/2007 | |
| WO | WO-2009/013597 A2 | 1/2009 | |
| WO | WO-2009/077802 | 6/2009 | |
| WO | WO-2010/067114 | 6/2010 | |
| WO | WO-2010/067117 | 6/2010 | |
| WO | WO-2010/125337 | 11/2010 | |
| WO | WO-2011/012825 | 2/2011 | |
| WO | WO-2011/051660 A1 | 5/2011 | |
| WO | WO-2011/055109 A2 | 5/2011 | |
| WO | WO-2011/107831 | 9/2011 | |
| WO | WO-2013/027006 A1 | 2/2013 | |
| WO | WO-2013/033274 A1 | 3/2013 | |
| WO | WO-2013/163347 | 10/2013 | |
| WO | WO-2014/091200 | 6/2014 | |

OTHER PUBLICATIONS

Office Action on U.S. Appl. No. 13/892,026 Dated Dec. 8, 2014, 19 pages.
Office Action on U.S. Appl. No. 13/892,057 Dated Nov. 28, 2014, 17 pages.
Webster's Third New International Dictionary 433 (1986), 3 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/892,026 Dated Apr. 3, 2015, 17 pages.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 pages.
Non-Final Office Action on U.S. Appl. No. 13/844,456 Apr. 1, 2015, XX Pages.
Non-Final Office Action on U.S. Appl. No. 13/869,866 Dated May 28, 2014, 16 pages.
Non-Final Office Action on U.S. Appl. No. 14/044,676 Dated Apr. 9, 2015, 13 pages.
Non-Final Office Action on U.S. Appl. No. 14/225,062 Dated May 21, 2015, 11 pages.
Nordin, G., et al., Journal of the Optical Society of America A., vol. 9, No. 12, Dec. 1992, pp. 2206-2217, 12 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.

(56) References Cited

OTHER PUBLICATIONS

Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Non-Final Office Action on U.S. Appl. No. 13/250,858 dated Jun. 12, 2015, 20 pages.
Final Office Action on U.S. Appl. No. 13/869,866 Dated Oct. 3, 2014, 17 pages.
Final Office Action on U.S. Appl. No. 14/038,400 Dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 Dated Jul. 14, 2015, 32 pages.
Non-Final Office Action on U.S. Appl. No. 14/152,756, mail date Aug. 25, 2015, 39 pages.
Non-Final Office Action on U.S. Appl. No. 14/168,173 Dated Jun. 22, 2015, 14 pages.
Notice of Allowance on U.S. Appl. No. 13/355,360 Dated Apr. 10, 2014, 7 pages.
Office Action, USPTO, U.S. Appl. No. 10/696,507, mailed on Nov. 13, 2008 (CTX-290US), 15 pages.
Irie, Masahiro, Photochromic diarylethenes for photonic devices, Pure and Applied Chemistry, 1996, pp. 1367-1371, vol. 68, No. 7, IUPAC.
Non-Final Office Action on U.S. Appl. No. 13/250,858 Dated Sep. 15, 2014, 16 pages.
Non-Final Office Action on U.S. Appl. No. 13/864,991 Dated Oct. 22, 2014, 16 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Plastic has replaced glass in photochromic lens, www.plastemart.com, 2003, 1 page.
Ayras et al., Exit Pupil Expander with a Large Field of View Based on Diffractive Optics, Journal of the SID, 2009, 6 pages.
Cameron, A., The Application of Holograhpic Optical Waveguide Technology to Q-Sight Family of Helmet Mounted Displays, Proc. of SPIE, vol. 7326, 7326OH-1, 2009, 11 pages.
Notice of Allowance for U.S. Appl. No. 12/700,557, mail date Oct. 22, 2013, 9 pages.
Office Action for U.S. Appl. No. 12/700,557, mail date Aug. 9, 2013, 12 pages.
Office Action for U.S. Appl. No. 12/700,557, mail date Feb. 4, 2013, 11 pages.
Office Action for U.S. Appl. No. 13/250,621, mail date May 21, 2013, 10 pages.
Office Action for U.S. Appl. No. 13/250,858 Dated Feb. 19, 2014, 13 page.
Office Action for U.S. Appl. No. 13/250,858, mail date Oct. 28, 2013, 9 pages.
Office Action for U.S. Appl. No. 13/250,940, mail date Aug. 28, 2013, 15 pages.
Office Action for U.S. Appl. No. 13/250,940, mail date Mar. 12, 2013, 11 pages.
Office Action for U.S. Appl. No. 13/250,970, mail date Jul. 30, 2013, 4 pages.
Office Action for U.S. Appl. No. 13/250,994, mail date Sep. 16, 2013, 11 pages.
Office Action on U.S. Appl. No. 13/250,940 Dated Mar. 25, 2014, 12 pages.
Office Action on U.S. Appl. No. 13/251,087 Dated Mar. 28, 2014, 12 pages.
Wisely, P.L., Head up and head mounted display performance improvements through advanced techniques in the manipulation of light, Proc. of SPIE vol. 7327, 732706-1, 2009, 10 pages.
Final Office Action on U.S. Appl. No. 13/250,858 Dated Feb. 4, 2015, 18 pages.
Final Office Action on U.S. Appl. No. 13/892,057 Dated Mar. 5, 2015, 21 pages.
Non-Final Office Action on U.S. Appl. No. 14/038,400 Dated Feb. 5, 2015, 18 pages.
Final Office Action issued in U.S. Appl. No. 13/864,991 dated Jun. 27, 2016.
Non-Final Office Action issued in U.S. Appl. No. 13/892,057, dated May 16, 2016.
Final Office Action on U.S. Appl. No. 13/892,057 dated Nov. 20, 2015, 30 pages.
Non-Final Office Action on U.S. Appl. No. 13/844,456, dated Jan. 15, 2016, 16 Pages.
Non-Final Office Action on U.S. Appl. No. 13/864,991 dated Nov. 30, 2015, 18 pages.
Non-Final Office Action on U.S. Appl. No. 14/044,676, dated Jan. 20, 2016, 21 pages.
Notice of Allowance on U.S. Appl. No. 13/432,662, dated Feb. 18, 2016, 10 pages.
Non-Final Office Action on U.S. Appl. No. 13/892,026 dated Mar. 22, 2016, 16 pages.
Non-Final Office Action on U.S. Appl. No. 13/250,858, dated Mar. 18, 2016, 20 pages.
Non-final Office Action on U.S. Appl. No. 13/250,858, dated Nov. 14, 2016, 18 pages.
Notice of Allowance on U.S. Appl. No. 13/864,991, dated Feb. 2, 2017, 10 pages.
Notice of Allowance on U.S. Appl. No. 13/892,057, dated Nov. 8, 2016, 10 pages.

* cited by examiner

HUD SYSTEM AND METHOD WITH DYNAMIC LIGHT EXCLUSION

CROSS REFERENCE TO RELATED APPLICATIONS

The present application is related to: U.S. patent application Ser. No. 13/892,057, filed on May 10, 2013, by Stratton et al., and U.S. patent application Ser. No. 13/864,991, filed on Apr. 17, 2013 by Tiana et al., incorporated herein by reference herein in their entireties and assigned to the assignee of the present application.

BACKGROUND OF THE INVENTION

The present specification relates to displays. More particularly, the present specification relates to head up displays (HUDs).

Conventional HUDs utilize an image source and a combiner to provide an image (e.g., symbology, enhanced vision, etc.) to a user. The user (e.g., a pilot) can view the image on the combiner as well as an environmental scene through the combiner. Substrate guided HUDs have been proposed which use waveguide combiners to preserve eye box size while reducing lens size. U.S. Pat. No. 4,309,070 issued to St. Leger Searle and U.S. Pat. No. 4,711,512 issued to Upatnieks disclose waveguide HUDs.

HUDs can be susceptible to a loss of contrast ratio in certain environmental conditions. The loss of contrast ratio can be due to bright light in the environment often associated with direct lunar light, direct solar light, lunar reflection or solar reflection. The bright light can strike the combiner or other optical components and dominate the background and/or image or portions thereof. In substrate guided HUDs, the loss of contrast ratio can also be due to interference when the diffractive gratings in substrate waveguides are exposed to bright light.

The susceptibility to loss of contrast ratio is increased in glass cockpit environments, such as, those associated with tactical aircraft. For example, the bright light (e.g., from the sun, bright clouds, the moon and reflections) can directly strike the combiner or other optical components through the windshield, glass canopy, windows, etc. and overcome or saturate the background and/or image or portions thereof. The saturation can occur at specific points or areas on the combiner and does not necessarily affect the entire display. Conventional uses of tinted lens and visors can reduce background saturation, but do not adequately solve lower contrast ratio issues.

Accordingly, there is a need for a HUD that is less susceptible to lower contrast ratios caused by non-uniform bright light from the environment. Further still, there is a need for a HUD having a waveguide combiner that is less susceptible to solar and lunar specular reflection. There is also a need for a system and method of eliminating or mitigating image quality degradation due to bright light in the environment. Further still, there is a need for a combiner which can mitigate the effects of refractive saturation on image quality of a waveguide display. Further still, there is a need for an inexpensive, lightweight solution for preventing or reducing solar or lunar light saturation of the background scene.

SUMMARY OF THE INVENTION

An exemplary embodiment relates to a head up display (HUD) for use in an environment and for providing light from an image source. The head up display includes a sensor array, a combiner, and a dynamic gradient. The combiner can be configured to allow viewing of an outside scene and information from the image source. The dynamic gradient is disposed to selectably reduce or prevent transmission through the combiner of bright light from the environment observed by the sensor array.

Another exemplary embodiment relates to a method of providing information to a pilot in an environment. The method includes providing light associated with the information to a combiner, sensing a location of a bright light from the environment on the combiner, and attenuating the bright light reaching the combiner at the location.

Still another exemplary embodiment relates to a head up display. The head up display includes a saturation mitigator and a waveguide combiner including an input grating and an output grating. The saturation mitigator is disposed to prevent bright light from outside the waveguide combiner from being provided through the output grating and reaching an eye box. The saturation mitigator is selectably opaque of at least one area associated with a location of the bright light.

A further embodiment relates to a HUD. The HUD can include an image source, a sensor array, a combiner, and a dynamic gradient. The combiner is configured to allow viewing of an outside scene and information from the image source. The dynamic gradient is disposed to selectably reduce or prevent transmission of one or more bright lights sensed by the sensor array.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
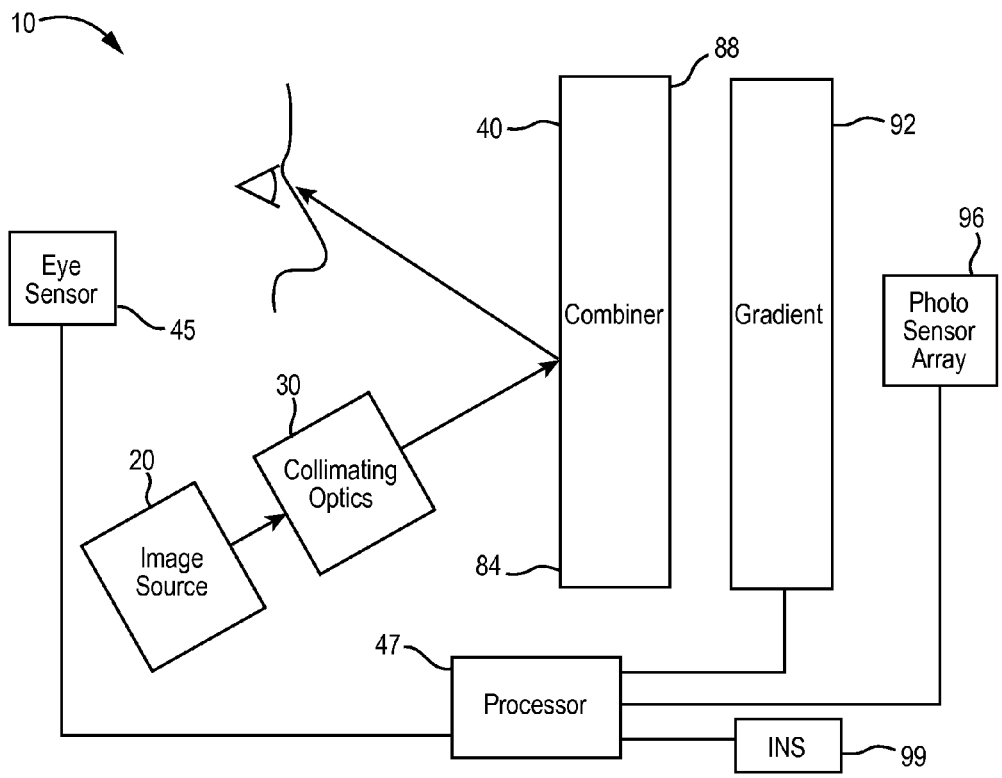
FIG. 1 is a general schematic block diagram of a head up display (HUD) system including reflective or holographic combiner with a bright light mitigator in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a head up display (HUD) system 10 can be utilized in various applications, including but not limited to aviation, medical, naval, targeting, ground based, military, etc. HUD system 10 advantageously is configured to reduce loss of contrast ratio due to bright light in the environment in one embodiment. System 10 includes a control or processing circuit 47, a saturation mitigator or dynamic gradient 92, a bright light sensor 96, an image source 20, optics 30, and a combiner 40 in one embodiment. System 10 can also include an optional eye sensor 45 and an INS 99 or other navigational sensor in one embodiment.

In operation, system 10 provides images from image source 20 to a pilot or other operator so that the pilot can simultaneously view the images and a real world scene. The images can include graphic and/or text information (e.g., flight path vector, target icons, etc.) related to avionic information in one embodiment. In addition, the images can include synthetic or enhanced vision images. In one embodiment, collimated light representing the image from image source 20 is projected onto combiner 40 by optics 30 so that the pilot can view the image conformally on the real world scene through combiner 40. In one embodiment, combiner 40 is preferably transparent for viewing the real world scene through main surfaces or sides 84 and 88.

System 10 advantageously reduces low contrast ratio issues related to bright light in the environment by sensing the location of the bright light in the environment with respect to eye position and attenuating the bright light using gradient 92 to reduce its effect on the image provided on combiner 40 in one embodiment. In one embodiment, processing circuit 47 dynamically controls areas on gradient 92 so that the areas associated with the location of the sensed bright light are more opaque (e.g., less transmissive in one embodiment) than the remainder of gradient 92. The processing circuit 47 can use gaze information or pupil location data from sensor 45 to determine the appropriate areas to make more opaque.

Combiner 40 can be a flat or curved, semi-reflective or holographic combiner. Combiner 40 can be disposed in a fixed location in the cockpit or can be a worn component. Image source 20 can be any device for providing an image including but not limited to a CRT display, an LED display, an active matrix liquid crystal display (LCD), etc. Image source 20 can be located in front of or behind combiner 40 with respect to the windshield in one embodiment.

Collimating optics 30 can be a projector disposed between combiner 40 and image source 20 in one embodiment. Collimating optics 30 can be a single optical component, such as a lens, or include multiple optical components. In one embodiment, collimating optics 30 are configured as a catadioptric collimator. In one embodiment, optics 30 together with an optically powered combiner 40 cooperate to provide the collimated light to the user. Collimating optics 30 can be any optical component or configuration of optical components that provide light (preferably collimated light) from image source 20 to combiner 40. Collimating optics 30 can be integrated with or spaced apart from image source 20 and/or combiner 40. Optics 30 can be an overhead projector.

Sensor 45 can be any device for determining head position or eye position. In one embodiment, sensor 45 can utilize infrared or other light to detect the area where the pupil of an eye of the user is looking. Sensor 45 can be part of a head tracking system in one embodiment. Sensor 45 can be an inward facing eye tracker in one embodiment. Sensor 45 can be a pupil sensor that provides accurate eye box position information in one embodiment. Sensor 45 can provide a gaze information signal or data to processing circuit 45.

Sensor 96 can be any device for determining a location of bright light in the environment. In one embodiment, sensor 96 can be a two or three axis photovoltaic sensor. In one embodiment, sensor 96 can be a visible light camera. The location of the bright light can be determined in two dimensions by sensor 96. Sensor 96 can provide a bright light location signal or data to processing circuit 47. The signal or data can provide an indication of the location of one or more bright lights in the environment in one embodiment. Sensor 96 can include an integrated circuit array of photovoltaic sensors to sense a relative position of the brightest points of light in the field-of-view of system 10 in one embodiment. Sensor 96 can include a processing circuit to filter, condition and/or process the data for processing circuit 47.

INS 99 can be any device for providing navigation information. In one embodiment, INS 99 can provide velocity and acceleration information associated with system 10 (e.g., associated with the aircraft to processing circuit 47). INS 99 can also provide positional information (e.g., heading, attitude, altitude, longitude, latitude, pitch, roll, etc.) to processing circuit 47 in one embodiment. Alternatively, other sensors or computers can provide navigation information to processing circuit 47.

Processing circuit 47 can be a computer (e.g., part of a HUD computer, flight computer, display computer, navigation computer, display computer, etc.) in one embodiment. Circuit 47 can be a standalone circuit or be integrated with other line replaceable units or computers. Processing circuit 47 can control gradient 92 in response to signals or data from one or more of sensor 45, sensor 96, and INS 99. In one embodiment, processing circuit 47 executes software to control gradient 92 to attenuate bright light virtually displayed on combiner 40.

Figure 5:
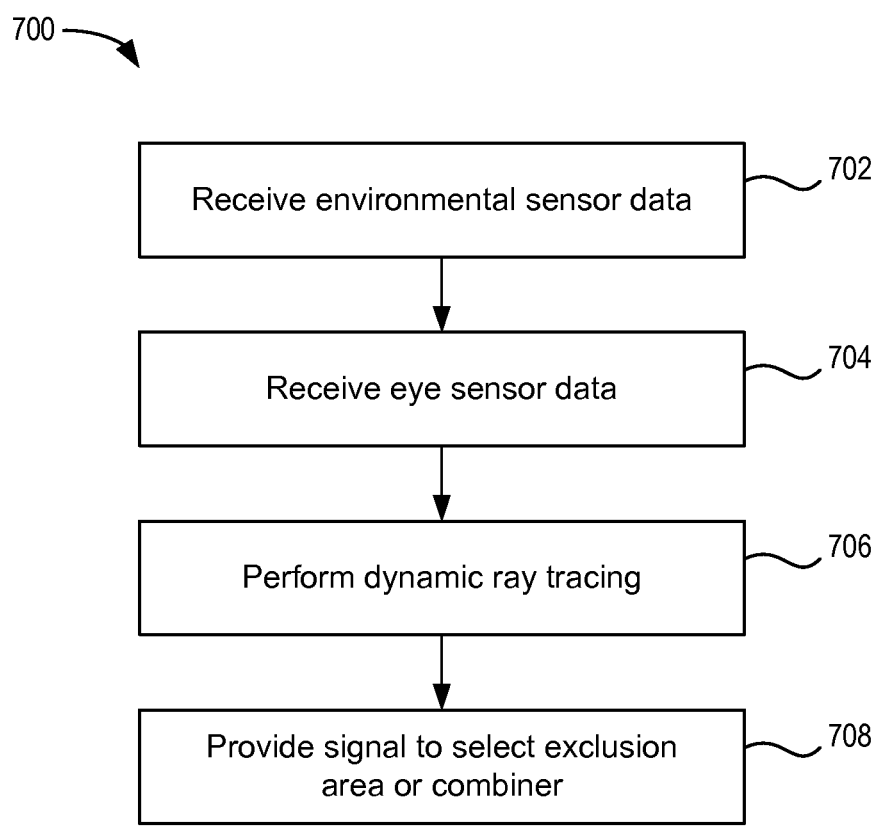
FIG. 5 is a flow diagram showing operation of the HUD systems illustrated in FIGS. 1 and 2, according to another exemplary embodiment.

The software executed on processing circuit 47 can utilize the data from sensor 45 and sensor array 96 to perform a process (e.g., process 700 described in FIG. 5) to track and locate bright lights and control gradient 92 in accordance with the tracking and locating of the bright lights in one embodiment. Tracking software (e.g., ray tracing software) executed by processing circuit 47 determines the perceived location of the bright light on combiner 40 with respect to eye position. In addition, the tracking software can use velocity and positional data from INS 99 to predict future perceived locations of the bright light and control gradient 92 accordingly in one embodiment.

Software executed by processing circuit 47 can triangulate known positions of the sun or moon, the eye, and combiner 40 to provide map data. The map data can indicate bright light position relative to combiner 40. The bright light position can be a solar, lunar, or bright light position or related specular position as perceived by the pilot in one embodiment. Processing circuit 47 can provide a control signal or control data to dynamic gradient 92 so that dynamic gradient 92 will block or attenuate the area associated with the bright light striking combiner 40. In one embodiment, an angular area is blocked (e.g., an angular area of 0.5 degrees).

Gradient 92 can be any device for selectably blocking or attenuating bright light in response to a control signal or control data from circuit 47 in one embodiment. According to one embodiment, gradient 92 is a dynamic gradient for attenuating bright light from the environment and preventing such light from affecting the view of information on combiner 40. In one embodiment, gradient 92 can be a layer or layers that can attenuate bright light from the environment provided through combiner 40. Gradient 92 can be provided between combiner 40 and a windshield or other entry area for environmental bright light.

In one embodiment, gradient 92 is a liquid crystal or OLED film having pixels that can be set to levels of opaqueness. In one embodiment, gradient 92 can be an active matrix LCD or film. In another embodiment, the dynamic gradient is a dynamic neutral density (ND) filter. A neutral density filter can selectably have areas with a rating of 0 (no reduction of intensity) and 1 (a reduction of intensity by a factor of 10), with a rating of 0 and 2, 0 and 3, etc. Alternatively, a neutral filter can have areas of 1 or 2, 1 or 3, etc. In one embodiment, gradient 92 is a layer or medium that includes dynamically controlled polarized layers. Gradient 92 can be disposed directly on combiner 40 or spaced apart from combiner 40.

Gradient 92 (e.g. dynamic filter) filter can have areas which are selectable for providing attenuation so that only an exclusion area associated with the area where bright light would strike combiner 40 is opaque. The area is preferably in a shape corresponding to the shape of the light and is approximately a percentage level larger to prevent corona effects (e.g., 10% larger). Accordingly, bright outside light is not allowed to pass and yet projected symbology/images are unaffected on combiner 40.

The term bright light refers to a light having sufficient intensity to adversely affect the image quality (e.g., contrast ratio) provided by system 10. For example, the reduction of solar intensity will greatly increase contrast ratio and allow the pilot to continue to use the entire field-of-view of the HUD without loss of capability in daylight and moonlight operating conditions in one embodiment.

Given the high velocities in flight, a target on combiner 40 will not likely hide in a particular location due to specular point or solar blockage for a very long time. Targets will most likely pass through the areas allowing the pilot to see the target as it passes through in one embodiment. Accordingly, matching the area of the exclusion (e.g., opaque) area to the size of the bright light provides advantages.

Figure 2:
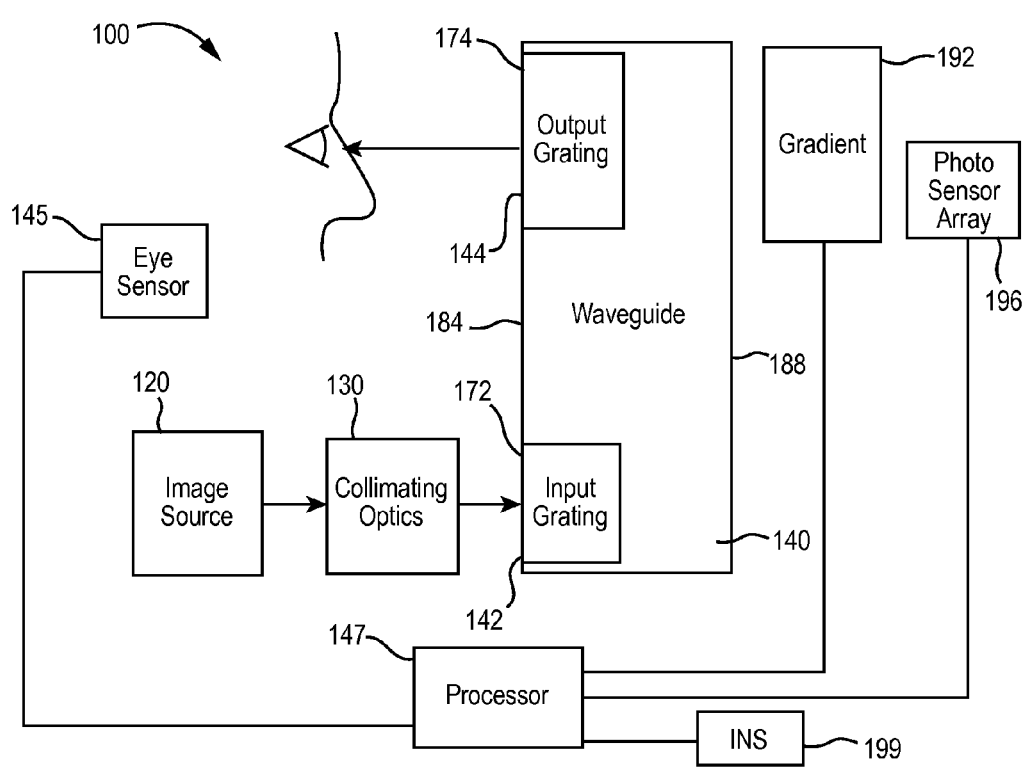
FIG. 2 is a general schematic block diagram of a HUD system including a waveguide combiner with a bright light mitigator in accordance with another exemplary embodiment.

With reference to FIG. 2, a head up display (HUD) system 100, similar to system 10, can be utilized in various applications, including but not limited to aviation, medical, naval, targeting, ground based, military, etc. In one embodiment, HUD system 100 is configured for use in smaller cockpit environments and yet provides an appropriate field of view and eye box for avionic applications. In one embodiment, HUD system 100 is configured for larger cockpit environments or tactical cockpit environments.

HUD system 100 includes INS 199 (similar to INS 99), gradient 192 (similar to gradient 92), collimating optics 130, eye sensor 145 (similar to sensor 45), a sensor 196 (similar to sensor 96), a processing circuit 147 (similar to circuit 47), an image source 120 and a substrate waveguide combiner 140 in one embodiment. Image source 120 can be any device for providing an image including but not limited to a CRT display, an LED display, an active matrix liquid crystal display (LCD), a light emitting diode, laser illuminator, etc. In one embodiment, image source 120 is a micro LCD assembly or liquid crystal on silicon (LCOS) display and can provide linearly polarized light. Image source 120 can include a laser or LED backlight.

In operation, HUD system 110 provides images from image source 120 to a pilot or other operator so that the pilot can simultaneously view the images and a real world scene. The images can include graphic and/or text information (e.g., flight path vector, target icons, etc.) related to avionic information in one embodiment. In addition, the images can include synthetic or enhanced vision images. In one embodiment, collimated light representing the image from image source 120 is provided on substrate waveguide combiner 140 so that the pilot can view the image conformally on the real world scene through substrate waveguide combiner 140. Similar to system 10 discussed with reference to FIG. 1, system 100 includes dynamic gradient 192, sensor 196, eye sensor 195, processing circuit 147, and INS 199 which can advantageously mitigate the effects of bright light from the environment striking combiner 140. INS 99, gradient 192, eye sensor 145, a sensor 196, and a processing circuit 147 can advantageously be used to mitigate contrast ratio reduction due to environmental bright light (e.g., as described below with reference to FIG. 5) according to one embodiment.

Collimating optics 130 can be disposed between substrate waveguide combiner 140 and image source 120. Collimating optics 130 can be a single optical component, such as a lens, or include multiple optical components. In one embodiment, collimating optics 130 are configured as a catadioptric collimator. Collimating optics 130 can be any optical component or configuration of optical components that provide light (preferably collimated light) from image source 120 to substrate waveguide combiner 140. Collimating optics 130 can be integrated with or spaced apart from image source 120 and/or substrate waveguide combiner 140.

Substrate waveguide combiner 140 can be a single glass plate or can be made from two or more fixed glass plates. Substrate waveguide combiner 140 can have a variety of shapes including generally rectangular, oval, circular, tear drop-shaped, hexagonal, rectangular with rounded corners, square-shaped, etc. Combiner 140 can include a coupler 142 and a coupler 144.

Couplers 142 and 144 can be input and output coupling gratings that provide excellent image quality and acceptable brightness in one embodiment. Couplers 142 and 144 are implemented as any type of diffractive element (e.g., dichromated gratings, holographic, Bragg gratings, or blazed surface relief gratings) in one embodiment. Couplers 142 and 144 can be implemented according to a number of techniques including but not limited to mechanical reproduction, holographic formation, embossing, casting (e.g., into a polymer resin), or lithography.

In operation, substrate waveguide combiner 140 advantageously receives light from image source 120 provided through collimating optics 130 at an input 172 and provides light to a user at its output 174. Image source 120 provides information using a single color of light (e.g., green light approximately between 500 and 550 nanometers (nm)) in one embodiment. Light provided to substrate waveguide 40 is preferably linearly S-polarized or P-polarized and collimated in one embodiment. Alternatively, other polarization, multiple colors, or other colors at different wavelengths can be utilized without departing from the scope of the invention. Optics 130 can have an output disposed directly adjacent or attached to coupler 142 in one embodiment.

Substrate waveguide combiner 140 performs two operations in one preferred embodiment. First, substrate waveguide combiner 140 is disposed to provide a medium for transporting light by total internal reflection from input 172 to output 174. Light is reflected multiple times off of opposing main sides 184 and 188 of combiner 140 as it travels from input 172 to output 174. Second, substrate waveguide combiner 140 operates as a combiner allowing the user to view the light from image source 120 at output 174 and light from the real world scene through sides 184 and 188.

Light from collimating optics 130 first strikes coupler 142 at input 172 on side 184 of substrate waveguide combiner 140. Coupler 142 diffracts light toward the length of combiner 140 so that it travels by total internal reflection to output 174 on side 184. At output 174, coupler 144 diffracts the light toward the user and out of the substrate waveguide combiner 140.

Couplers 142 and 144 are disposed on respective opposing sides 184 and 188 of substrate waveguide 140 in one embodiment. Couplers 142 and 144 can also be formed on the same side 184 of or within waveguide combiner 140 in one alternative embodiment. Couplers 142 and 144 can be disposed respectively on sides 188 and 184 of waveguide combiner 140, within waveguide combiner 140 or both on the same side 188 of waveguide combiner 140 in other alternative embodiments.

Couplers 142 and 144 are preferably disposed in respective areas that are rectangular in shape and have the same width as each other in one embodiment. Alternatively, couplers 142 and 44 can have different widths. Coupler 144 has a greater height than coupler 142 in one embodiment. Without the operation of processing circuit 47 and gradient 192, combiner 140 may be susceptible to refractive saturation through gradients due to coupler 144 diffracting light from the environment into the eye box.

Gradient 192 can be provided as a layer over a side 184 of combiner 140 in one embodiment. Gradient 92 can be provided over an area associated with coupler 144 in one embodiment. System parameters and design criteria can affect the placement of gradient 192.

Systems 10 and 100 can utilize partial and dynamic exclusion of saturated areas according to processes similar to machine vision systems (e.g., earth observing satellites, helio dynamic observing satellites, etc.) Advantageously, systems 10 and 100 can also take into account the placement of the human vision to provide more precise placement of saturation areas.

Figure 3:
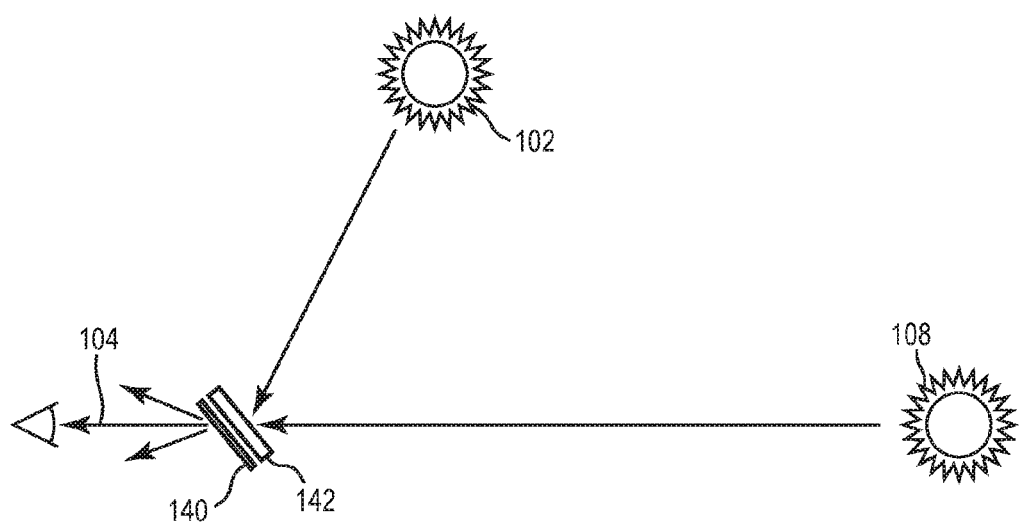
FIG. 3 is a general schematic block diagram of the waveguide combiner and bright light mitigator for the head up display system illustrated in FIG. 2 showing bright light striking the waveguide combiner in accordance with another exemplary embodiment.

With reference to FIG. 3, substrate waveguide combiner 140 is shown wherein solar light from sun 102 in the environment is virtually provided through combiner 140 into an eye box 104 at a virtual location 108. Processing circuit 147 utilizing data from eye sensor 45 and sensor 196 can advantageously attenuate light at the area associated with virtual image 108 of sun 102.

With reference to FIGS. 1, 2, 3, and 5, processing circuit 47 and 147 can perform process 700 (FIG. 5) to attenuate bright light through respective combiners 40 and 140. Process 700 is described below with respect to system 100. Process 700 can be performed by system 10 or 600 without departing from exemplary embodiments disclosed herein.

At an operation 702, processing circuit 147 receives sensor data from sensor 196. The data from sensor 196 indicates the position of the sun 102 (or other bright light) with respect to the position of combiner 140 (or the aircraft on which system 100 is employed).

Processing circuit 147 can sense the brightest portions in the field of view of sensor 196 and send telemetry data to tracking software associated with circuit 147. The brightest portions can be determined by comparing to a threshold. The threshold can be a fixed value or related to an average value (e.g., more than 20%, 40%, or 60% higher than the average).

At an operation 704, processing circuit 147 receives eye tracking data associated with eye sensor 145. Eye sensor 147 senses the position of the pupil and provides data to software 147 so that tracking can occur.

At an operation 706, processing circuit 147 uses the sensor telemetry data from sensor 196 to determine where the bright light source (e.g., the sun, moon, bright cloud, etc.) is with respect to the aircraft. Processing circuit 147 can utilize data from INS 199 or other sensors to receive velocity and acceleration data (velocity and acceleration deltas). Triangulations with known positions of the sun, the eye and combiner 140 are utilized to provide a map relative to combiner 140 with the sun position (and other specular positions as necessary) as perceived by the pilot.

Processing circuit 147 can use a Kalman filter to translate into pixel space on the combiner 140 in one embodiment. In one embodiment, gradient 192 has a 1000×1000 pixels or more. Alternatively, a lower number of pixels can be utilized. Processing circuit 147 provides signals or data to gradient 192 to block or otherwise attenuate the area associated with the sun 102 at an operation 708.

Figure 4:
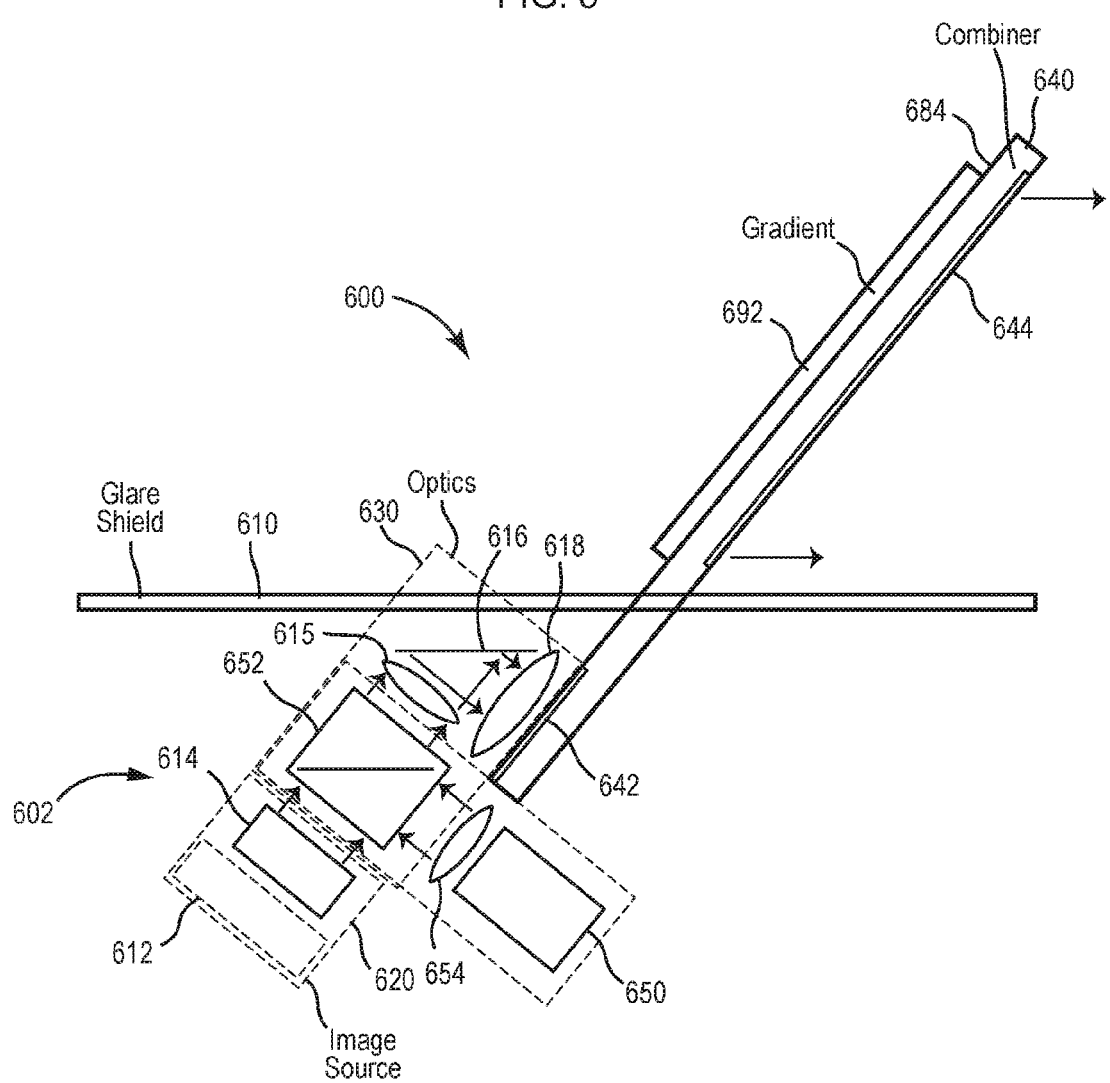
FIG. 4 is side view schematic drawing of yet another embodiment of the HUD system illustrated in FIG. 2 in accordance with another exemplary embodiment.

With reference to FIG. 4, HUD system 600 includes a dynamic gradient 692 provided on a waveguide combiner 640. In one embodiment, gradient 692 is similar to gradient 192. Gradient 692 can be spaced apart from a surface 684. In one embodiment, gradient 692 can be physically separated and parallel to surface 684. System 600 can include the components similar to circuit 147, sensors 145 and 196 and INS 99 of system 100 for controlling gradient 692 to mitigate bright light saturation.

HUD system 600 is comprised of a projector 602. Projector 602 is provided beneath a top surface glare shield 610 in one embodiment. Substrate waveguide combiner 640 can be disposed through a glare shield 610 such that the input end of substrate waveguide 640 is beneath glare shield.

Projector 602 can include image source 620 and collimating optics 630. Image source 620 can include a backlight 612 which can be an LED backlight in one embodiment. Image source 620 can also include display 614 which can be an active matrix LCD, although other types of image sources 620 are available according to alternative embodiments.

In one embodiment, projector 602 is an LCOS based system including a beam splitter 652, an LED or laser illuminator 650, and an LCOS display in the position of display 614. An image shaping lens 654 is provided between illuminator 650 and beam splitter 652. Beam splitter 652 reflects polarized (e.g., s-polarized) light and provides the light to display 614 which selectively rotates the polarization to p-polarized light in one embodiment. The p-polarized light is provided through beam splitter 652 and collimating optics 630.

Collimating optics 630 includes a lens 615, a mirror 616 and a lens 618 in one embodiment. Lens 615, mirror 616 and lens 618 are configured to provide collimated light to couplers 642 and 644. Optics 630 can be embodied in various forms including more or fewer components. HUD system 600 can have a bent waveguide combiner configuration in one embodiment.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display for use in a cockpit environment for providing light from an image source, the head up display comprising:
    a sensor array;
    a combiner configured to allow viewing of an outside scene and information from the image source, wherein the combiner comprises a waveguide have an input and an output, the light associated with the information traveling from the input to the output by total internal reflection within the waveguide, wherein bright light from the cockpit environment is virtually provided through the waveguide into an eye box at a virtual location;
    a processing circuit configured to determine the virtual location in response to data from the sensor array and provide a control signal; and
    a dynamic gradient disposed to selectably reduce or prevent transmission through the combiner of the bright light from the cockpit environment observed by the sensor array in response to the control signal, the dynamic gradient utilizing at least one selectably opaque area to reduce or prevent transmission of the bright light through the combiner, the at least one selectably opaque area corresponding to the virtual location of the bright light on the combiner, and wherein the at least one selectably opaque area is shaped to a correspond to a shape of the bright location at the virtual location on the combiner.

2. The head up display of claim 1, wherein the dynamic gradient comprises a dynamic filter.

3. The head up display of claim 1, wherein the dynamic gradient is disposed on a side of the combiner closer to a windshield than another side of the combiner.

4. The head up display of claim 1, wherein the combiner comprises at least one diffractive element coupler.

5. The head up display of claim 4, wherein the dynamic gradient covers an area associated with the diffractive element coupler.

6. The head up display of claim 1, wherein the dynamic gradient creates an exclusion area on a pixel-by-pixel basis.

7. The head up display of claim 1, further comprising an eye sensor.

8. The head up display of claim 7, wherein the processing circuit is configured to receive aircraft position, velocity and acceleration parameters and correlate a first position of a user eye, and a second position of a bright light on the sensor array and uses the first and second position to select a location to reduce or prevent transmission of the bright light on the dynamic gradient.

9. The head up display of claim 1, wherein the dynamic gradient comprises a liquid crystal material, organic light emitting diode material, or dynamic neutral density filter.

10. The head up display of claim 1, wherein the processing circuit is configured to determine a future position of the bright light in response to the portion and velocity parameters and control the dynamic gradient accordingly.

11. A method of providing information to a pilot in an aviation environment, the method comprising:
    providing light associated with the information to a combiner, wherein the combiner comprises a waveguide have an input and an output, the light associated with the information traveling from the input to the output by total internal reflection within the waveguide, wherein bright light in the cockpit environment is provided through the waveguide into an eye box at a virtual location;
    sensing a location of the bright light from the environment and determining the virtual location in response to data from a sensor array and
    attenuating the bright light at the virtual location by utilizing at least one selectably opaque area wherein the at least one selectably opaque area is shaped to correspond to a shape of the bright light at the virtual location.

12. The method of claim 11, further comprising executing software to perform real time computational analysis to determine the location of both a source of the bright light and the position of the eye.

13. The method of claim 11, wherein the determining uses an eye location, a velocity parameter of the aircraft, and a position parameter of the aircraft.

14. The method of claim 13, wherein the determining use, the velocity parameter and the position parameter to determine a future location of the bright light in an environment.

15. The method of claim 14, wherein the location of the bright light in the environment is triangulated to the location on the combiner using data from an eye sensor.

16. The method of claim 11, wherein the attenuating uses an LCD or a dynamic filter.

17. A head up display, comprising:
    a waveguide combiner including an input grating and an output grating, wherein light associated with information travels from the input grating from the output grating by total internal reflection within the waveguide combiner, wherein bright light in an environment of the cockpit is virtually provided through the waveguide combiner into an eye box at a virtual location; and
    a saturation mitigator disposed to prevent bright light from outside the waveguide combiner from being provided through the output grating and reaching the eye box, the saturation mitigator being selectably opaque in at least one area, the at least one area corresponding to the virtual location of the bright light, and wherein the at least one area is shaped to correspond to a shape of the bright light at the location.

18. The head up display of claim 17, further comprising a bright light sensor.

19. The head up display of claim 17, further comprising an eye sensor.

20. The head up display of claim 17, further comprising a processor for locating the bright light and correlating the location of the bright light to the area.

* * * * *